March 14, 1950     R. B. CALCUTT ET AL     2,500,342

TIRE AND METHOD OF MOUNTING THE SAME

Filed June 4, 1947     2 Sheets-Sheet 1

Inventors.
Reginald B. Calcutt
Helen Steiner
By    Atty.

March 14, 1950   R. B. CALCUTT ET AL   2,500,342
TIRE AND METHOD OF MOUNTING THE SAME
Filed June 4, 1947   2 Sheets-Sheet 2
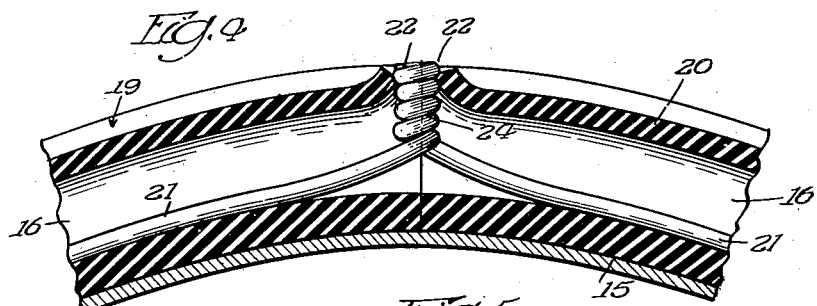
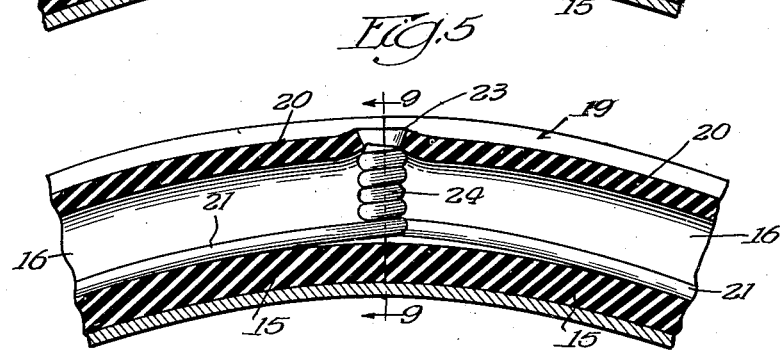
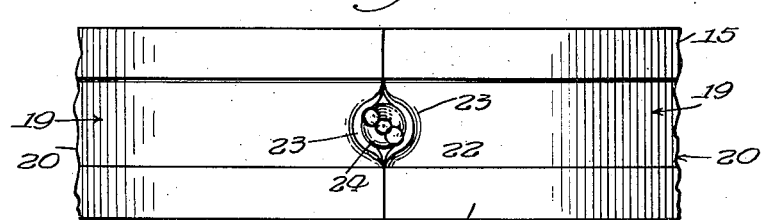
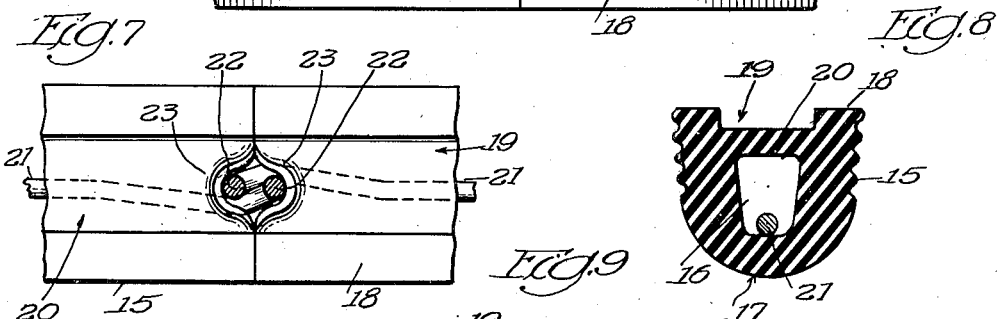
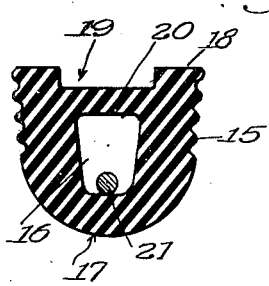
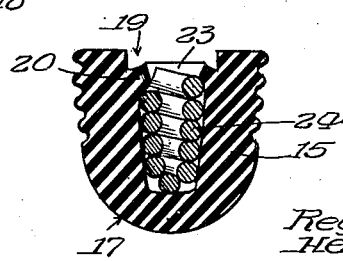
Inventors
Reginald B. Calcutt
Helen Steiner Patented Mar. 14, 1950

2,500,342

UNITED STATES PATENT OFFICE 2,500,342

TIRE AND METHOD OF MOUNTING THE SAME

Reginald B. Calcutt and Helen Steiner, Chicago, Ill.

Application June 4, 1947, Serial No. 752,350

4 Claims. (Cl. 152—389)

This invention relates to tires, and to the method of mounting or attaching the same to a wheel, and one of the objects of the invention is to provide an improved form of tire, and an improved method of fastening the same to a wheel, which tire will be of a simple and durable construction, and may be readily applied by an ordinary mechanic without the necessity of employing the services of an expert.

A further object is to provide an improved tire which can be manufactured in long lengths, and then severed into predetermined shorter pieces of lengths, according to the diameter of the wheel to the periphery of which the tire is to be attached, thereby obviating the necessity of manufacturing endless tires of different diameters to fit the varying sizes of wheels.

To the attainment of these ends, and the accomplishment of other new and useful objects as will appear, the invention consists in the features of novelty in substantially the construction, combination and arrangement of the several parts, and in substantially the method, and steps in the method of applying the same to the wheel, hereinafter more fully described and claimed, and shown in the accompanying drawing illustrating this invention, in which Fig. 1 is a side elevation of a wheel, having a tire attached thereto in accordance with the principles of this invention.

Fig. 4 is a view similar to Fig. 3, showing the next step.

Fig. 5 is a view similar to Fig. 4, showing the final step in the securing of the tire to the wheel.

Fig. 6 is a top plan view of Fig. 5.

Fig. 7 is a detail view showing the manner in which a portion of the fastening means compresses a portion of one end of a portion of the tire in its application to the wheel.

Fig. 8 is a cross-sectional view of the tire.

Fig. 9 is an enlarged detail sectional view on line 9—9, Fig. 5.

Figure 1:
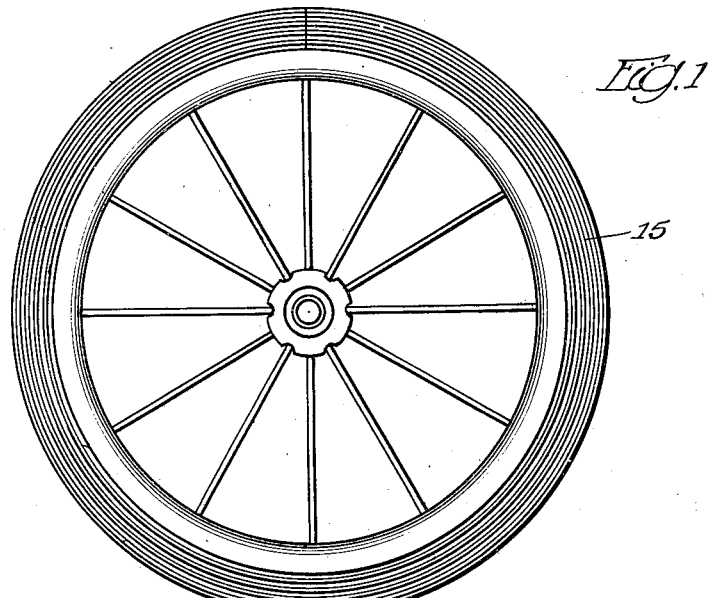

The type of tire to which this invention is particularly directed relates to those usually applied to the wheels of baby carriages, velocipedes, perambulators, wheel chairs, and the like, which tires are of tubular rubber construction and are held in position on the rim or felloe of the wheel by means of a wire threaded through the tire, with the ends of the wire united by twisting, welding, or any other suitable manner of fastening them together.

In the drawing, the tire 15 is formed of rubber or any other suitable resilient material, and is manufactured in long lengths, and an amount sufficient to encompass the periphery or felloe of the wheel to which it is to be secured, is cut off. The tire is of a tubular construction, having a passage 16 extending entirely therethrough, and through the end thereof. The passage 16 is spaced a sufficient distance from the periphery thereof to provide a felloe-engaging portion 17, and a tread portion 18.

The tire is also provided with a groove or channel 19, which opens through the tread 18 and extends lengthwise of the tire. The opening 16 and the groove or channel 19 are separated by a partition 20, which latter is spaced from the tread and forms one wall of the opening 16, being integral with the tire throughout its entire length. A binding or anchoring element 21 is threaded through the opening 16, and the ends 22 are brought together, as shown in Fig. 2; that is, so that they will cross each other and extend between adjacent ends of the partition 20 and the tire, through the groove or channel 19, and a short distance beyond the periphery or tread of the tire.

Figure 2:
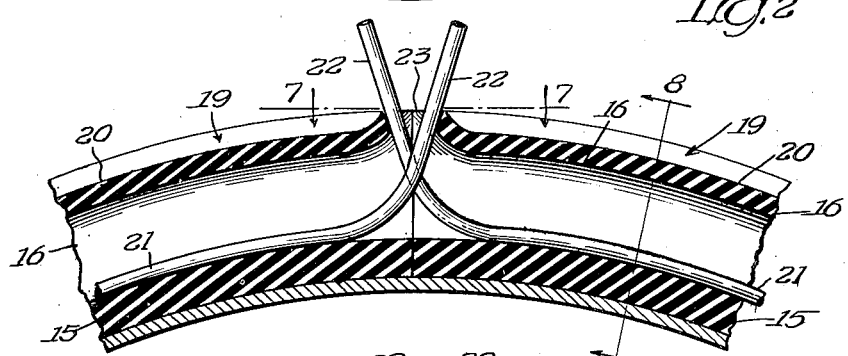
Fig. 2 is a sectional view of a portion of a tire, showing the first step in the application of the securing means.

When the parts are in the position shown in Fig. 2, the ends of the tire will abut, and the ends of the partition 20 will be compressed by the binding element, to provide a space through which the ends 22 of the element 21 will pass. The partition 20 being comparatively thin, the portion engaged by the ends 22 will be compressed or deflected, as at 23, while the ends of the tire will abut, as shown in Fig. 6.

Figure 3:
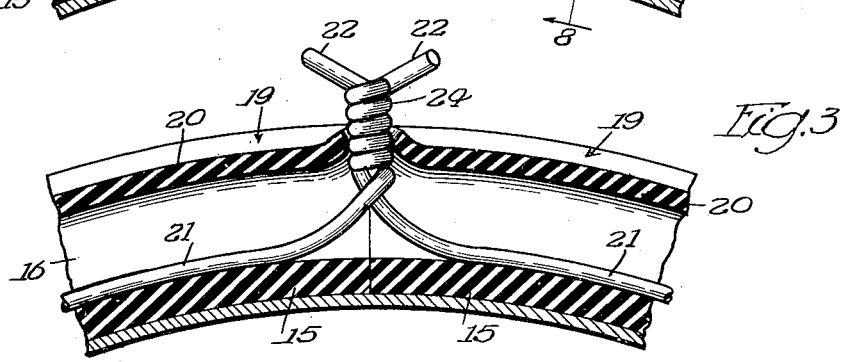
Fig. 3 is a view similar to Fig. 2, showing the second step.

The projecting ends 22 of the element 21 may then be grasped with a tool, and twisted together to form a coil 24, or the tire may be twisted with respect to the tool. This will further compress the ends of the partition 20, as shown more clearly in Fig. 3. The twisting of the ends of the element 21 will draw the element tightly about the wheel and firmly seat the tire against the felloe, and at the same time cause the ends of the tire to be held tightly against each other.

After the coil 24 has been formed, it will be disposed at a substantially right angle to the body of the element 21. A portion of the coil 24 is then cut off, as close to the outer face of the partition 20 as possible, as shown in Fig. 4, so that the ends 22 will project only a short distance beyond the partition 20. These ends and the coil 24 are then forced toward the wheel felloe, in any suitable manner, and by any suitable tool, such as a punch, screw driver or the like, by engaging the end of the tool with the end of the coil, and then striking the tool. This will force the coil through the space formed at the ends of the partition 20, and against the body of the element 21, as shown in Fig. 5. During this step of the operation, the coil will remain at substantially a right angle to the body portion of the anchoring members.

At this time, the deflected or compressed portion of the ends of the partition will expand and partially close the opening, at the same time encompassing and hugging the adjacent portion of the coil 24, as shown in Figs. 5 and 6. When the tire is thus fastened, the coil will be depressed at substantially a right angle to the felloe, and transversely of the opening 16 in the tire, and the top of the coil will be disposed below the plane of the top of the partition 20.

In this position, and as the wheel rotates, any pressure exerted upon the end of the coil will be in a direction lengthwise thereof, and the tendency is to force the coil inwardly toward the felloe, which will further tighten or increase the tension of the binding or fastening element 21 upon the tire.

While the preferred form of the invention is herein shown and described, it is to be understood that changes may be made in the details of construction, and in the combination and arrangement of the several parts, and in the method and steps in the method of attaching the tire to the wheel, within the scope of the invention and the claims, without departing from the spirit of this invention.

What is claimed as new is:

1. A wheel tire adapted to be arranged on a wheel felloe and embodying a length of yieldable material forming a body, said body having an opening extending completely within the body throughout its entire length, a tread on said body, the material between the tread and said opening forming a partition integral with the body throughout the entire length thereof, and an elongated flexible element extending entirely through said opening and projecting a predetermined distance beyond the ends of the body, the ends of the body abutting each other and the ends of the flexible element extending angularly outwardly between the abutting edges of the body and compressing said partition in directions lengthwise of the body to provide a space through which the ends of said flexible element pass, the ends of said flexible element being twisted together to form a coil, said coil being disposed at a substantially right angle to the wheel felloe, the free end of said coil being positioned substantially within the plane of the outer surface of the partition.

2. A tire for a wheel comprising an elongated strip of flexible material having a tread including spaced outer ribs with a groove therebetween, said strip having an interior elongated opening extending completely throughout the length thereof and positioned below said groove, the thickness of the material between the groove and the interior opening being relatively thin and flexible, a flexible member extending throughout the entire length of the interior opening and projecting a predetermined distance beyond each end of the strip to provide securing ends, the ends of the strip having abutting relationship and the securing ends of the flexible member extending substantially at right angles from the abutting ends of the strip, said securing ends being twisted together so that the inner surface of the tire may have tight engagement with a wheel felloe, the outer securing ends of the twisted flexible member terminating below the outer surface of said ribs.

3. The method of forming a tire for application on a wheel felloe which consists in forming a predetermined length of flexible tire material with a tread including spaced ribs with a groove therebetween and an internal opening within the material and extending throughout its entire length, inserting a flexible element in said opening, the length of the element being longer than the material to provide ends extending beyond each end of the material to provide attaching means, applying the length of material to a felloe with the ends of the material in abutting relationship, bending the ends of the element at right angles to the felloe at the point where the ends of the material abut, twisting the ends to tighten the flexible element, and cutting off the twisted end at a point substantially flush with the outer surface of the tread at the groove.

4. The method of forming a tire for application on a wheel felloe which consists in forming a predetermined length of flexible tire material with a tread including spaced ribs with a groove therebetween and an internal opening within the material and extending throughout its entire length, inserting a flexible element in said opening, the length of the element being longer than the material to provide ends extending beyond each end of the material to provide attaching means, applying the length of material to a felloe with the ends of the material in abutting relationship, bending the ends of the element at right angles to the felloe at the point where the ends of the material abut, twisting the ends to tighten the flexible element, and cutting off the twisted end at a point substantially flush with the outer surface of the tread at the groove, and finally pushing the twisted end below the outer surface of the tread at the groove.

REGINALD B. CALCUTT.
HELEN STEINER.

REFERENCES CITED

The following references are of record in the file of this patent:

UNITED STATES PATENTS

| Number | Name | Date |
| --- | --- | --- |
| 431,223 | Claypool | July 1, 1890 |
| 463,153 | Hoffman | Nov. 17, 1891 |
| 893,672 | Stutsman | July 21, 1908 |